April 21, 1970     L. B. ALEXANDER ET AL     3,507,392
JUICE FILTER

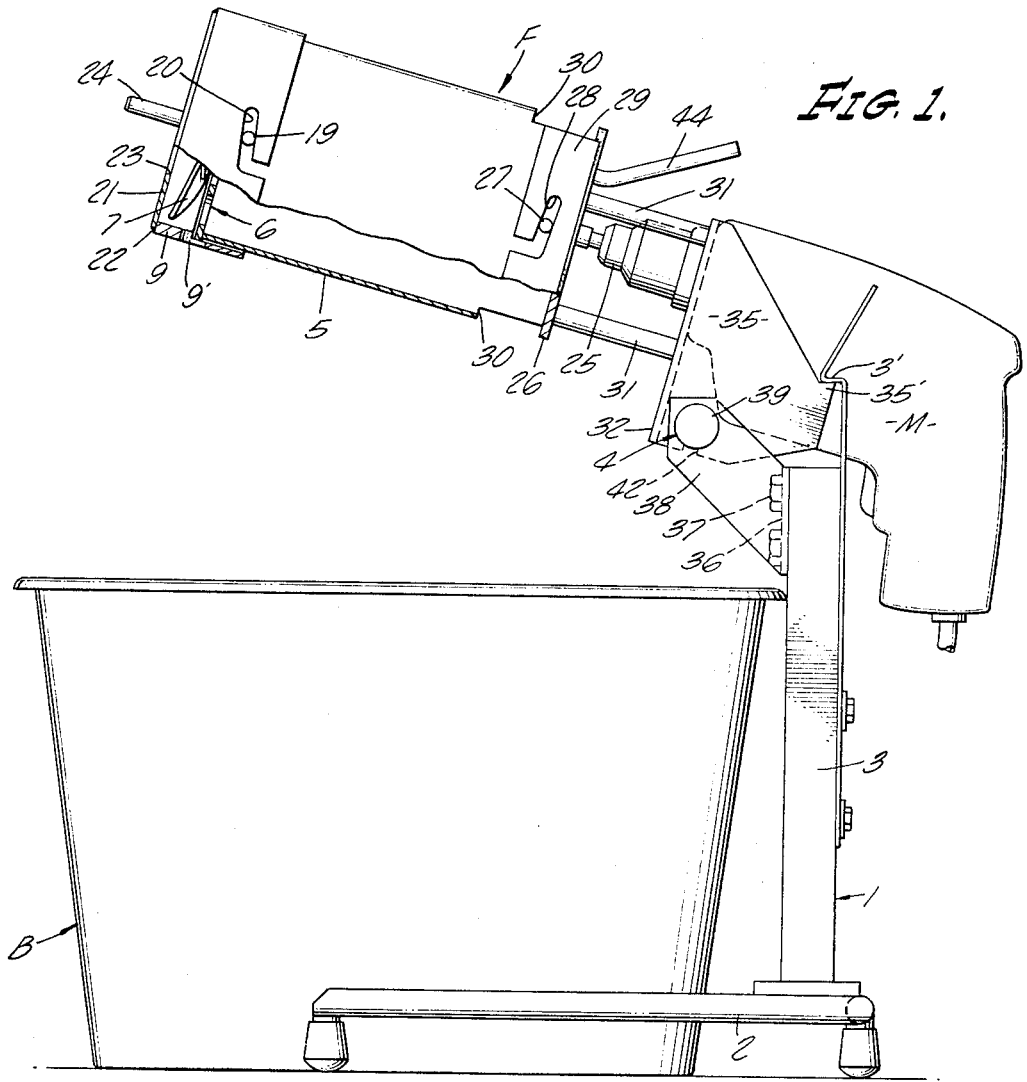

Filed Dec. 2, 1966                                                   2 Sheets-Sheet 2

L. BRUCE ALEXANDER
RONALD C. BUSHMAN
FRANKLIN K. HOLBROOK
INVENTORS

BY Paul A. Weilein

ATTORNEY

United States Patent Office 3,507,392
Patented Apr. 21, 1970

3,507,392
JUICE FILTER
L Bruce Alexander, San Marino, Ronald C. Bushman and Franklin K. Holbrook, Whittier, Calif., assignors to Brown International Corporation, Covina, Calif., a corporation of California
Filed Dec. 2, 1966, Ser. No. 598,865
Int. Cl. B01d 29/04
U.S. Cl. 210—172                14 Claims

ABSTRACT OF THE DISCLOSURE

A citrus juice filter to reduce the viscosity of a sample quantity of juice in respect of which it is desired that a Brix determination be made by the use of the conventional hydrometer, and including a receiver to be placed in a body of citrus fruit juice in combination with a filter screen through which juice is caused to flow by an impeller in such a fashion that particulate matter in the juice is separated from the liquid body and the receiver is filled with liquid of a viscosity less than the main body of juice and from which the sample may be taken.

---

In the determination of relative value of lots of citrus fruit, it is the practice to take a random sampling of a few fruit from the lot, for example, approximately 45 pounds from a 20 ton load, and to extract the juice from the random sample. The extracted juice is evaluated to determine the value of the fruit comprising the entire load. One of the tests made in evaluating the sample juice is a determination of the specific gravity or Brix by the use of a hydrometer, but in some instances the sample quantity of juice is of such viscosity due to the presence of particles of fruit pulp and juice cell fragments that the hydrometer does not properly seek a level truly indicative of the specific gravity of the body of juice.

Accordingly, an object of the present invention is the provision of apparatus whereby a quantity of juice may be taken from a sample batch of juice in such a manner as to reduce the viscosity of the quantity of juice so removed, whereby the usual hydrometer will efficiently show the true Brix of the quantity of juice derived from the sample batch, thus enhancing the complete evaluation of the sample fruit taken from a complete fruit load as an indication of the value of the entire load.

A more specific object is to provide a filter apparatus adapted to be disposed in a container of juice and having means for agitating the juice so as to maintain the particles of pulp and juice cell fragments and the like in suspension within the moving body of juice and to filter from the moving body a quantity of the juice, which quantity will be of reduced viscosity as compared with the body of juice from which it is taken.

Another object of the invention is to provide filter apparatus for use in obtaining reduced viscosity quantities of juice from a body of more viscous juice, which includes a filter screen having small diameter openings therethrough, that is, small diameter openings as compared with the diameter of the openings through which the juice has previously passed during the usual juice extraction operations when the juice is being pressed from the fruit, the filter apparatus further including means for impelling the juice through the filter screen and for effecting a washing of juice past the screen openings so as to prevent the obstruction of the screen openings by the solid particles as the juice passes through the screen openings.

Still another object is to provide a filter apparatus in accordance with the preceding objectives including a simple support for the filter apparatus whereby the same may be moved between an upper, out of the way position, and a lowered position in which the screen is disposed within a receptacle containing the body of juice from which the reduced viscosity quantity is to be removed; the filter apparatus moreover being simple in construction and susceptible of disassembly for purposes of cleaning, but the filter apparatus being so constructed that the need for cleaning is minimized in that the apparatus is so constructed that it is not only adapted to automatically wash clean the filter screen during the filtering operation, but is also so constructed that when in the upper or out of the way position it is self-draining, thereby minimizing the need for cleaning the same.

Other objects and advantages of the invention will be hereinafter described or will become apparent to those skilled in the art.

In the accompanying drawings:

FIG. 1 is a view in side elevation with a portion of the filter apparatus broken away and shown in section and illustrating the apparatus in an upper, out of the way position relative to a fruit juice receptacle;

FIG. 2 is a view partly in side elevation and partly in section illustrating the filter apparatus in a filtering position within the juice receptacle;

FIG. 3 is a view in horizontal section and on a slightly enlarged scale as taken on the line 3—3 of FIG. 2 and more specifically illustrating the pivotal mounting of the filter apparatus on its support;

FIG. 4 is a horizontal sectional view on a slightly enlarged scale as taken on the line 4—4 of FIG. 2; and FIG. 5 is a view in vertical section on an enlarged scale as taken on the line 5—5 of FIG. 2.

Like reference characters in the several views of the drawings and in the following description designate corresponding parts.

Referring to FIG. 1, the juice filtering apparatus of the present invention is shown as generally comprising a supporting stand 1 having a base 2 and a standard 3, the base 2 being formed so as to accommodate a receptacle or bucket B containing a body of juice derived from fruit and from which it is desired to obtain a low viscosity quantity of juice in which the usual hydrometer will efficiently function to show the Brix. At its upper end the standard 3 is provided with means generally denoted at 4 for pivotally supporting the filter assembly generally denoted at F. This assembly F is movable between the upper, out of the way position shown in FIG. 1, to the position shown in FIG. 2 in which the filter assembly F is disposed in the bucket B.

The filter assembly comprises broadly a juice receiver 5, filter screen means 6 at the lower end of the receiver 5, and pump means for causing juice to flow through the filter screen with juice particles being washed from the screen while juice liquid passes through the screen, the pump means including a rotary impeller 7 disposed adjacent the screen and means for rotating the impeller comprising a motor M the output of which is connected to an impeller shaft 8, the impeller 7 being shrouded by a skirt 9 and retained on the shaft 8 by a nut 7', the nut being welded to the impeller so that the impeller may be manually installed upon the shaft without use of tools.

As best seen in FIG. 5, the filter screen means 6 comprises an inner plate 10 having a central hub 11 through which the shaft 8 extends, there being within the hub 11 a suitable bushing 12 having at its lower extremity an out-turned flange 13 by which the impeller 7 is maintained in adjacent but preferably slightly spaced relation to a lower filter screen 14. This screen 14 is provided with small diameter openings 15 therethrough and is preferably composed of a thin sheet of stainless steel backed up by the upper plate 10 having large openings 16 therein through which juice will pass as it flows through the small openings 15. It will be noted that the impeller 7 has its blades so disposed as to induce upward flow of juice upon right hand rotation of the shaft 8.

The upper filter plate 10 is secured to or formed as a part of the receiver 5 and, in the illustrative embodiment, the plate 10 is welded as at 17 to the lower extremity of the hollow receiver body. The filter screen 14 is held in place against the lower face of the upper plate 10 by means of the out-turned flange 13 of bearing 12 as well as by the skirt 9 which shrouds the impeller 7 and which is provided with an internal shoulder 18 engageable with the screen 14.

This skirt 9 is removably secured to the lower end of the receiver 5 so as to enable ease of disassembly thereof by suitable means such as a bayonet slot connection including pins 19 at diametrically spaced locations on the receiver 5 engageable in bayonet slots 20 in the upper portion of the skirt 9. Beneath the skirt 9 is a plate 21 suitably secured thereto as by welding at 22 and having a central enlarged inlet opening 23 whereby juice will flow into the pump chamber defined between the plate 21 and the filter screen means 6. In addition, the plate 21 is provided with suitable legs 24 serving as means to support the receiver 5 and the pump means just described in upwardly spaced relation to the bottom of the fruit juice receptacle or bucket B.

The pump shaft 8 is connected to the motor M by means of a suitable separable connection designated 25 at a location above a top plate 26 which is at the upper end of the receiver 5 and which is removably secured thereto as by means of a pin 27 and bayonet slot 28 connection at diametrically opposite locations, the slots 28 being formed in depending arcuate segments 29 welded or otherwise secured to the top plate 26 and defining therebetween windows 30 at the upper end of the receiver, through which upwardly flowing juice may emerge from the receiver during operation of the pump means. A rubber sealing disk 26a is mounted on the shaft and may slidably engage the undersurface of plate 26 to prevent the flow of juice along the shaft.

In the illustrative embodiment the motor M included in the pump means is shown as a typical hand operated electrically powered drill motor, and the separable connection 25 is constituted by the usual chuck which is adapted to support the drill bit. In addition, support members 31 are provided to establish a rigid connection between the motor M and the top plate 26. These members 31 are connected to a motor supporting plate 32, as best seen in FIG. 3, by suitable fasteners 33, and in addition, the plate 32 is connected to the case of the motor M by means of fasteners 34 extended upwardly through the plate and into the motor case.

Means are provided for shiftably supporting the assembled motor M, receiver 5, and pump means for movement of the lower end of the receiver into and out of a body of juice contained in the receptacle or bucket B which, as seen in FIG. 2, may contain juice up to the level shown by the dot-dash line. More specifically, the means for shiftably mounting the assembly comprises upstanding brackets 35 at opposite sides of the motor mounting plate 32 and a complemental bracket having a base plate 36 secured by fasteners 37 to the standard 3 and also having side walls 38 adapted to be pivotally interconnected with the brackets 35 of motor supporting plate 32. The pivotal support further includes a pivot pin 39 extended through openings 40, 40 in the brackets 35 and having portions disposed in openings 41, 41 in bracket walls 38. Reduced slots 42, 42 in brackets 35 lead into openings 40 and pivot pin 39 has a pair of reduced diameter sections 43, 43 adapted upon axial movement of the pivot pin 39 against the bias of a spring 39' to be disposed in openings 40 and in such positions to pass through slots 42 whereby the entire filter assembly F including the motor M is removable from the support 1.

However, when the filter assembly F is retained on the support 1 by the pivot pin 39, it is movable between the working position shown in FIG. 2 and the upper, out of the way position shown in FIG. 1, at which there is clearance for the placement of the receptacle or bucket B beneath the filter apparatus. Such a mounting facilitates use of the apparatus inasmuch as it would be used to take a sample out of a number of successive buckets.

In order to maintain the filter apparatus in the upper, out of the way position of FIG. 1, one of the brackets 35, as shown in FIG. 1, is provided with an outstanding portion 35' engageable by a spring latch 3' carried by the standard 3 and manually releasable when it is desired that the filter apparatus be lowered to the working position of FIG. 2.

Means are provided for taking from the receiver 5 a quantity of the juice therein and in the illustrative embodiment the upper plate 26 is provided with a tube 44 which extends downwardly into the receiver 5 as well as upwardly thereabove so as to be readily connectable to a vacuum line (not shown). Thus, a vacuum line may be readily connected to the tube 44 to enable the withdrawal of such a quantity of juice from the receiver 5 as may be desired during the operation of the pump means which causes upward flow of fluid through the receiver body and outwardly through the windows 30. The quantity of juice desired in this connection is simply enough of such juice to enable the use of a hydrometer in determining the Brix of the juice.

As heretofore pointed out, the hydrometer used in such operations does not efficiently function in viscous juice, that is, juice which is viscous due to the presence therein of solid, pulpy material taken from the fruit as the juice is being expressed from the fruit. The problem is more or less severe depending upon the fruit involved and the period of the season during which the fruit is picked. The viscosity of the quantity of juice taken from the receiver during the operation of the present filter apparatus, however, is such that the hydrometer will efficiently function.

Such operation of the filter apparatus in response to rotation of the pump impeller 7 involves the impelling of juice against the filter screen 14 and the passage of the screened juice liquids through the small openings 15. However, the rate of fluid flow against the screen exceeds the ability of the small openings 15 exposed within the openings 16 of the top plate 10 to pass the entire body of juice liquid and, therefore, a substantial volume of the juice impelled against the screen by the pump impeller is caused to flow radially outwardly over the underface of the screen 14 thereby flooding or washing away from the small openings 15 the bulk of solid particles tending to bridge the openings 15. Such volume of juice, moreover, is caused to essentially recirculate by the pump impeller and the result is substantial agitation of the body of juice within the bucket B. Thus, the screen is automatically cleaned and the juice is agitated to prevent settling of the solids.

Moreover, when the filter apparatus is moved to the upper, out of the way position of FIG. 1, the receiver 5 will automatically drain through one of the windows 30 and the impeller shroud 9 will automatically drain through a drain opening 9' formed in a side wall therein (see FIG. 1). Thus, while due to separable connections between the top plate 26 and the receiver 5 and the pump shroud 9 to the receiver 5, as well as the separable connection of the impeller to the shaft 8, the assembly may be easily broken down for the purpose of enabling washing of the individual components, the need for such washing is minimized due to the self-cleaning and self-draining characteristics of the filter apparatus as just described.

In the practical application of the present invention, it will be understood that the openings 15 through the filter screen 14 may be smaller than the screen openings through which the juice in the bucket B has previously passed during the juice extraction operation so as to assure removal of the solid particles from the sample quantity of juice which have previously been able to pass through the larger juice extraction screen. For example, tests were made to determine the practical application of the present filter apparatus in the reduction of juice viscosity, wherein the juice was expressed from fruit picked in Florida in the month of June 1966, through a screen having openings of .060" and the screen 14 of the present invention had small openings 15 of .005". The reductions in juice viscosity after filtering through the apparatus of the invention were on the order of 10:1 as measured by a Brookfield viscometer before and after filtering. Pulp content was reduced on the order of 4:1. Other changes occurred in the characteristics of the juice which had no effect on subsequent Brix determinations by the use of the hydrometer. In addition, numerous sample quantities of juice were taken from a number of buckets without evidence of significant reduction in filtration rate through the screen. As an example of a test as referred to above, the viscosity of juice in a test bucket was measured at 45.8 centipoise and such sample contained 20% pulp. The sample quantity obtained from the bucket through the filter apparatus of the present invention had a viscosity of 4.4 centipoise and a 5.0% pulp content.

From the foregoing, it will be noted that an extraordinary improvement in terms of reduction in time for making hydrometer tests and in efficiency of the hydrometer has been accomplished by the use of the present invention to filter juice prior to the making of such tests, since the hydrometer will rapidly reach an accurate, stable condition in the juice of low viscosity but will give very sluggish, inaccurate readings in the viscous juice.

While specific structural details have been shown and described, it should be understood that changes and alterations may resorted to.

What is claimed is:

1. Apparatus for providing a filtered sample quantity of juice from a main body of juice having a particulate therein, comprising: a filtered juice receiver adapted to have its lowermost end portion positioned in a space occupied by a main body of juice; filter screen means in said lowermost end portion of said receiver and having openings leading into said receiver from said space, a juice discharge window in the receiver above said space; and pump means below said screen for causing juice in said space to flow past said openings in such direction that particles in the juice in said space are washed from said screen back to said space while juice liquid passes through said openings into said receiver and overflows through said window back to said space.

2. Apparatus as defined in claim 1, wherein said pump means includes a rotary impeller disposed in said space adjacent said screen; and means for rotating said impeller.

3. Apparatus as defined in claim 1, wherein said pump means includes a rotary impeller disposed in said space adjacent said screen; means for rotating said impeller; and a skirt disposed about and shrouding said impeller.

4. Apparatus as defined in claim 1, wherein said pump means includes a rotary impeller disposed adjacent said screen; means for rotating said impeller; a skirt disposed about and shrouding said impeller; and means removably securing said skirt and said screen means on said receiver.

5. Apparatus as defined in claim 1, wherein said receiver comprises a body having an open lower end disposed in said space; said screen means being disposed in said open lower end; and said pump means being disposed below said screen means.

6. Apparatus as defined in claim 1, wherein said receiver comprises a body having an open lower end extending into said space; said screen means being disposed in said open lower end; said pump means being disposed below said screen means; said pump means including a pump shaft extending through said screen means and from the upper end of said receiver; and motor means for driving said pump shaft.

7. Apparatus as defined in claim 1, wherein said pump means includes a motor for said pump; and including means for supporting said receiver on said motor; a receptacle encompassing said space; and means for supporting said receiver in said receptacle.

8. Apparatus as defined in claim 7, wherein said means for supporting said receiver in said receptacle comprises legs on said receiver for supporting said receiver above the bottom of said receptacle.

9. Apparatus as defined in claim 7, wherein said means for supporting said receiver in said receptacle comprises a base support adapted to be disposed adjacent said receptacle and including means mounting said receiver for movement into and out of said receptacle.

10. Apparatus as defined in claim 7, wherein said means for supporting said receiver in said receptacle comprises a base support adapted to be disposed adjacent said receptacle and including means mounting said receiver for movement into and out of said receptacle; and means detachably supporting said receiver and said motor on said base support.

11. Apparatus as defined in claim 7, wherein said means for supporting said receiver on said motor includes a detachable connection for allowing disassembly of said receiver from said motor; and including a detachable connection between said pump and said motor.

12. Apparatus of the character described, comprising: a main receptacle for juice; a receiver adapted to be vertically disposed in said receptacle; said receiver having at its lower end means providing inlet openings for flow of juice from the receptacle into the receiver; a filter screen beneath said openings; an impeller disposed beneath said filter screen; an impeller shaft connected to said impeller and extended upwardly into said receiver; said receiver having at its upper end a top plate; said shaft extending through said top plate; means providing a laterally opening window adjacent the top of said receiver; motor means detachably connected to said shaft above said top plate; and means for supporting said motor means and said receiver so as to extend into the juice in said receptacle.

13. Apparatus according to claim 12, wherein said receiver is provided at its lower end with a shroud extended about said impeller; said shroud having a central opening for admission of juice from said receptacle into the shroud.

14. Apparatus according to claim 13, wherein said shroud has a lateral opening adjacent said screen and wherein said means for supporting said motor and receiver in said receptacle includes means for enabling pivotal movement of said motor and receiver to a position above said receptacle and in which said window in said receiver and said opening in said shroud are disposed downwardly for draining of juice from said receiver and said shroud into said receptacle.

References Cited

UNITED STATES PATENTS

| 1,950,924 | 3/1934 | Johnston | 210—415 |
| 2,295,982 | 9/1942 | Widman | 210—250 X |
| 2,533,936 | 12/1950 | Holmes et al. | 210—416 X |
| 3,172,850 | 3/1965 | Englesberg et al. | 210—416 X |
| 3,275,148 | 9/1966 | Vicino | 210—168 |

J. L. DECESARE, Primary Examiner

U.S. Cl. X.R.

210—250, 415, 416